April 2, 1963   I. JEPSON   3,083,871
SPRAY DEVICE AND METHOD OF DISPENSING LIQUIDS
Filed Aug. 13, 1959   2 Sheets-Sheet 1
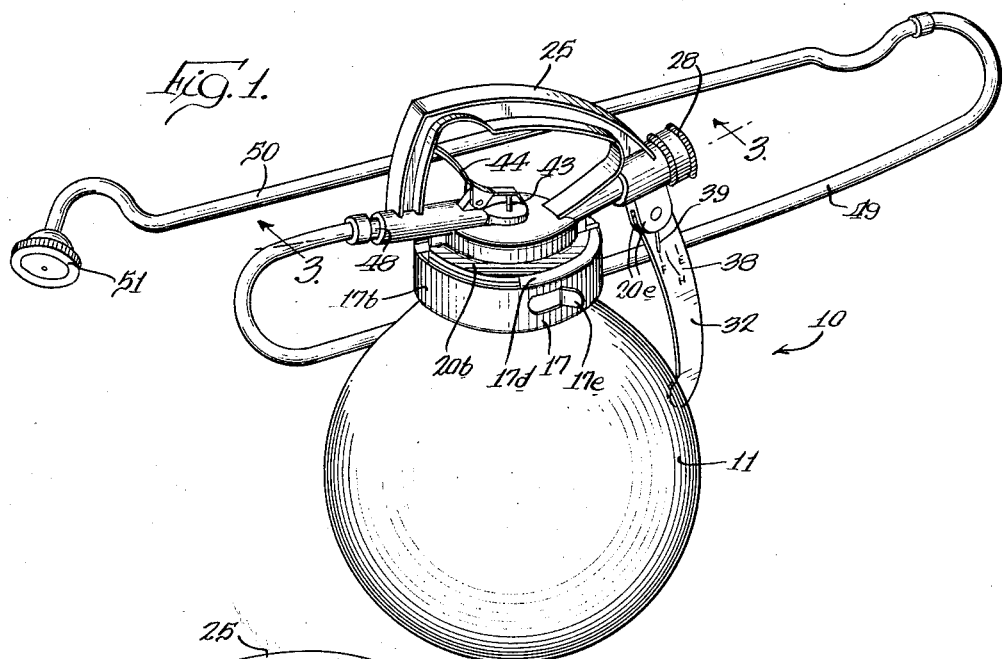
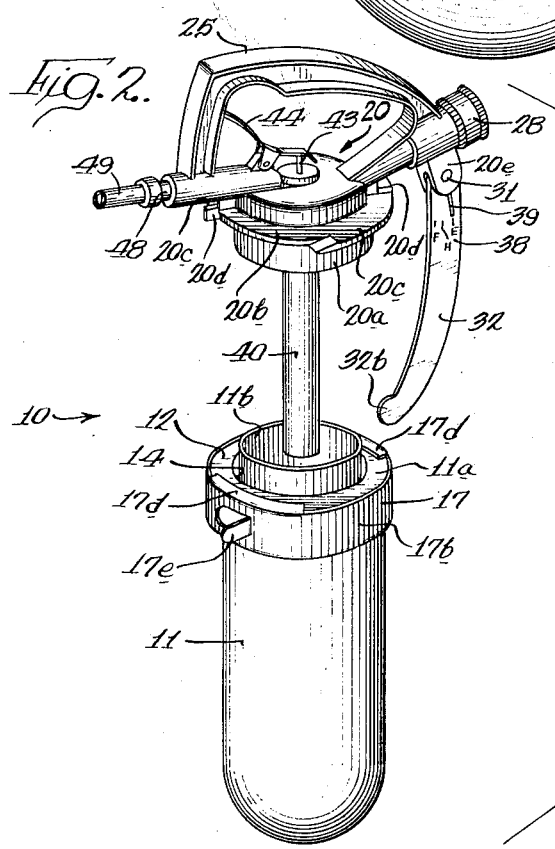
INVENTOR.
Ivar Jepson
BY George R. Clark
Atty.

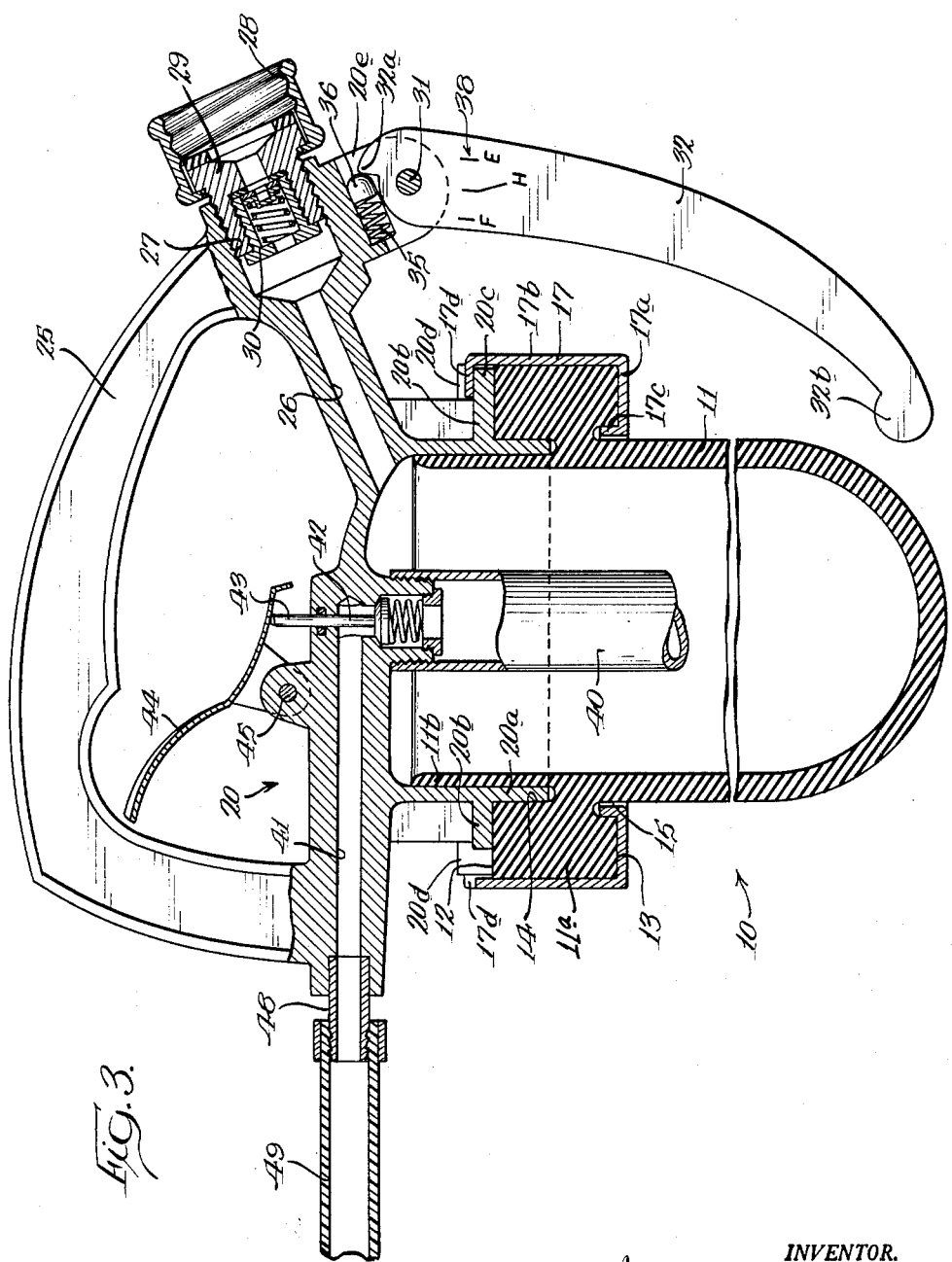

United States Patent Office 3,083,871
Patented Apr. 2, 1963

3,083,871
SPRAY DEVICE AND METHOD OF
DISPENSING LIQUIDS
Ivar Jepson, Oak Park, Ill., assignor to Sunbeam Corporation, Chicago, Ill., a corporation of Illinois
Filed Aug. 13, 1959, Ser. No. 833,566
12 Claims. (Cl. 222—41)

The present invention relates to a method of dispensing liquids as well as to a liquid spray device and, more particularly, to a spray device which may be used for numerous purposes such as for dispensing liquid insecticides, liquid weed killers, liquid fertilizers and the like.

In order to dispense insecticides, fertilizers and weed killers there is generally employed, in addition to the ordinary sprinkling can which is not very satisfactory, the so called conventional garden sprayer which commonly employs a heavy metal tank with a removable cover supporting a piston type pump arrangement and conventional spray nozzle generally associated with the tank. When it is desired to use the device, the specific insecticide, weed killer or the like to be sprayed is placed in the tank and mixed with the necessary liquid. The cover is then applied after which the pump is used to build up the necessary pressure within the tank. Thereupon, a suitable release valve is actuated whereby the material contained in the tank is released under pressure in spray form. These devices are relatively heavy and cumbersome since a rigid tank of considerable weight is employed to withstand the pressures that are involved and the tank must be of a size to hold a reasonable quantity of liquid. Generally such sprayers are of such size as to hold several gallons of liquid. A device of this size obviously presents a storage problem. A rather complicated pump mechanism is generally employed comprising a suitable piston mechanism.

These devices, in addition to presenting a problem in connection with the size and weight of the tank, are further complicated by the necessity of a rather complex, expensive pump mechanism. Such a pump mechanism commonly employs resilient leather washers or the like for the pump piston which deteriorate with use and when it is considered that such a garden sprayer is employed only a few months of the year and then is put away for another year additional deterioration sets in by the drying out process particularly with respect to leather washers and the like. Furthermore, in recent years such sprayers have been extensively used both to spray weed killing mixtures and insecticides. This presents a real problem for when the same device is utilized for both purposes, quantities of the weed killing mixtures often remain in the device and then are sprayed with insecticides onto plants such as roses and the like with the resultant destruction or at least injury thereto. The pump mechanism of such conventional garden sprays is very difficult to clean and one is never sure that the weed killing mixture is sufficiently removed so no damage to plants will result when used to dispense fertilizers or insecticides. Consequently, many users find it necessary to have separate spray devices for weed killing preparations and for insecticides and the like. It would be desirable therefore to provide a garden spray device which eliminates the size and weight problem of the conventional garden sprayer used heretofore, which eliminates the pumping mechanism with its inherent problems, and which comprises a very simple device which can be cleaned in a fast and expeditious manner to permit its use for weed killing preparations as well as for insecticides and fertilizers.

Accordingly, it is an object of the present invention to provide a new and improved liquid dispensing device.

It is another object of the present invention to provide an improved method of storing and dispensing liquid under pressure.

It is another object of the present invention to provide an improved garden spray device which requires no heavy rigid container, no pump means to store pressure in the container, and which may be cleaned in a simple and speedy manner.

Still another object of the present invention resides in the provision of a garden sprayer device in which the container is made of an expansible rubberlike material and the pressure for spraying the liquid is obtained from a conventional water supply line.

A still further object of the present invention resides in a garden sprayer comprising a relatively small container with heavy rubber walls into which the material to be dispensed is placed and wherein the ordinary water supply line is conected to the container to supply the necessary liquid to be sprayed and to expand the container to store energy in the expanded walls and wherein this stored energy is employed to dispense the liquid to be sprayed.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is a perspective view of the spray device of the present invention shown in a condition where the resilient walls of the container thereof are expanded and energy to cause the spray is stored in these walls;

FIG. 2 is an exploded perspective view of the spray device of the present invention with a portion of the spray nozzle removed showing the normal size of the device when not in use;

FIG. 3 is an enlarged sectional view taken on line 3—3 of FIG. 1 but with the resilient walls of the container in unexpanded condition; and FIG. 4 is a small fragmentary sectional view illustrating a modification of the spray device of the present invention.

Briefly, the present invention is concerned with a spray device in which a container in the form of a heavy rubberlike bag having the ability to store a large amount of energy in the resilient walls thereof is employed to supply a substantially constant pressure to dispense in spray form liquid from the container until the latter is substantially empty. A closure means is associated with the open end of this container in a pressuretight manner. The material to be sprayed is placed within the container and then the liquid with which this material is to be mixed is supplied to the container from an ordinary water supply line through a check valve which, upon placing the desired quantity in the container, may be disconnected from the water supply line without loss of any pressure. A conventional spray nozzle and manually actuated valve permits the dissipation of the pressure in the container which remains substantially constant until the walls of the container return to normal size. Means may be provided to prevent overfilling of the container.

Referring now to the drawings, there is illustrated a spray device generally indicated at 10 embodying the present invention. This spray device 10, in accordance with the present invention, comprises a cylindrical container 11 formed of rubber or other rubberlike material which is capable of expanding many times its normal size and which has a wall structure for storing energy therein upon expansion. This container 11 is illustrated as having an open top and a hemispherical closed bottom end. Obviously, it may have various sizes and shapes. In a device built in accordance with the present invention an elongated rubberlike container open at the top and having a diameter of the order of three inches and a length of the order of eight inches and a wall thickness of the order of between an eighth and a quarter of an inch was employed.

In order that this resilient container 11 may be associated with suitable closure means to close the open upper end thereof in a pressuretight manner, the container is provided near its upper end with an integral annular flange 11a which defines an upper annular shoulder or sealing surface 12 and a similar lower annular shoulder 13. An annular recess 14 is defined in the upper surface 12 of this flange 11a and, in fact, is partially defined in the walls of the container 11 since an upwardly extending cylindrical projection 11b thinner than the remaining walls of the container 11 is provided. An annular recess 15 is defined in the lower surface of flange 11a defining shoulder 13. The cross sectional area of the flange 11a should be large relative to the distance between the adjacent ends of recesses 14 and 15 for reasons set forth hereinafter.

For the purpose of producing with container 11 a subassembly which may readily be associated with other means, there is provided a suitable annular adapter 17 which is removably secured to the flange 11a as best shown in FIG. 3 of the drawings. The adapter 17 is essentially an annular member of somewhat L-shaped cross section with one leg 17a of the L engaging the lower annular shoulder 13 defined by the flange 11a while the other leg 17b of the L engages the periphery of the flange 11a. The end of the annular portion 17a is provided with a lateral annular flange 17c which when assembled with the container 11 extends into the annular recess 15 in shoulder 13. In order that the adapter 17 may be held in assembled relationship with the container 11 and for performing a locking function described hereinafter, the upper end of adapter 17 is provided with a pair of integral arcuate lateral flanges 17d arranged in diametrically opposed relationship. These flanges prevent inadvertent disassembly of the container 11 from the adapter 17 and also provide means for readily connecting and disconnecting the subassembly comprising the container 11 and the adapter 17 with suitable closure means. The adapter 17 is provided with suitable projections 17e which may be formed by cutout portions of the adapter bent at an angle. Preferably two such projections 17e are positioned at diametrically opposed positions so that a twisting force can readily be applied to adapter 17 in associating or disassociating it from suitable closure means.

For the purpose of closing the open upper end of the container 11 in a fluid and, in fact, pressuretight manner there is provided closure means generally designated at 20 which closure means is illustrated as comprising a coverlike member having a depending cylindrical portion 20a of a diameter as to telescopically receive the projection 11b of the container 11. Furthermore, the cylindrical portion 20a of closure means 20 is receivable within the recess 14 defined in the shoulder 12 of the annular flange 11a. The closure member 20 is also provided with a lateral annular flange 20b for engaging this shoulder 12 so that the closure means 20 may be secured in a sealed and pressuretight manner to the subassembly comprising the container 11 and adapter 17. The annular flange 20b is provided with diametrically opposed arcuate camming ears 20c which really are integral extensions of the flange 20b. To perform a camming operation these ears 20c gradually increase in thickness from one end thereof to the other as best shown in FIGS. 2 and 3 of the drawings. Thus at one end of the camming surfaces 20c are very thin and increase in thickness so as rapidly to approach the thickness of the flange 20b of which they are integral extensions. Consequently, it is difficult to tell where the flange 20b ends and the ears 20c start. It will be understood that the ears 20c are intended to be disposed beneath the flanges 17d of the adapter 17 to secure closure means 20 to the container 11. Consequently, these camming ears 20c are of an arcuate extent to be received in the arcuate spaces between the two flanges 17d whereupon twisting of the adapter 17 in a counterclockwise direction as viewed in FIG. 2 of the drawings relative to the closure means 20 will cause the thin ends of the ears 20c to move beneath the flanges 17d and as the thickness of the ears increases cause flange 20b to be disposed in sealing engagement with shoulder 12. To limit the maximum relative rotation of adapter 17 and closure means 20, suitable stops 20d in the form of integral projections at the ends of ears 20c remote from the thin portions thereof are provided. These stops are engageable by the flanges or ears 17d thus limiting the maximum relative rotation in one direction between the closure means 20 and the subassembly comprising the adapter 17 and container 11. It will be appreciated that the increase in thickness of the camming ears 20c will compress the peripheral flange 11a of the container between the bottom 17a of the adapter 17 and the flange 20b of the closure member 20 thus providing a fluidtight and pressuretight seal. It will furthermore be appreciated that any pressure developed within the container 11 will tend to push the cylindrical projection 11b against the telescoped interior cylindrical surface of the depending flange 20a of the closure member 20 thus providing a long seal area and insuring a leakproof construction.

Garden sprays are conventionally provided with some sort of handle means whereby the device may be carried over the area to be sprayed. To this end there is provided a handle 25 which has been illustrated as comprising an integral portion of the closure means 20. In fact, the closure means 20 and the handle 25 may be formed as a suitable integral casting if desired.

In order to store energy within the container 11 of the spray device 10 for dispensing a suitable liquid in spray form, it is intended with the present invention to use a source of liquid under pressure such as the ordinary water supply line provided in every home usually with an outside spigot to sprinkle lawns and the like. To this end, a suitable filling passageway 26 is defined in a part of the handle 25 which extends from the chamber defined within cylindrical flange 20a to the exterior terminating in an enlarged recess 27. As illustrated in FIG. 3, the recess 27 is adapted to threadedly receive a suitable assembly comprising a hose connector 28, an adapter 29 and a suitable check valve 30. The particular construction of the check valve 30 forms no part of the present invention, since it merely provides a one way path whereby water under pressure supplied by connecting, for example, a hose to the connector 28, will flow through the passageway 26 into the container 11 but not out of this container. Thus check valve 30 will permit a pressure to be built up within container 11 to the extent of the pressure of the water supply line and this will result in energy being stored in the resilient container walls which will expand as indicated in FIG. 1 of the drawings.

It should be appreciated that by making the cross sectional area of the flange 11a of container 11 large relative to the space between the adjacent ends of recesses 14 and 15, the container 11 will not pull free of the adapter 17 and cover 20 even with great expansion thereof. The particular construction illustrated has been found to be very satisfactory from this standpoint.

In utilizing the spray device of the present invention it is intended to remove the closure means 20 and insert within the container 11 the insecticide, weed killer, fertilizer or the like that it is intended to dispense in the form of a spray. The closure member 20 is then applied to the assembly comprising the container 11 and the adapter 17 in a sealed relationship and the connector 28 is connected to a suitable hose which, in turn, may be connected to the ordinary water supply line commonly present in all homes. As water is supplied to the container 11, the container will expand as indicated in FIG. 1 and energy will be stored within the walls of the container 11. The container will be supplied with water to the extent that the proper mixture of water and insecticide or water and weed killer or water and fertilizer is obtained. Thereafter, the hose ecoupling 28 will be disconnected from the hose or other supply conduit and the check valve 30 will retain the pressure within the container 11 and associated closure means 20. It will be appreciated that the expansible container 11 can be designed with a characteristic so as to maintain uniform pressure within the container regardless of the expansion thereof whereby a substantially constant pressure is provided until substantially all of the liquid is dispensed. This is a substantial improvement over existing spray devices where the pressure rapidly deteriorates with use and it is necessary to stop several times during the spraying operation to actuate the pump to restore the pressure. Obviously, in the prior art devices where the tank is rigid and the liquid is not compressible, the stored energy is in the form of air under pressure which dissipates rapidly.

For the purpose of providing an indication of the amount of water supplied to the container 11, various indicating means may be employed. As specifically illustrated in the drawings, the closure means 20 is provided with a pair of integral spaced projections or ears 20e for supporting a pivot pin 31 pivotally supporting thereon and between said ears 20e an indicating lever 32. As illustrated, the indicating lever 32 is provided with a lug 32a adjacent the pivotal end thereof for engaging suitable spring biasing means in the form of a compression spring 35 and a projection or spring head 36 engageable by the lug 32a. The compression spring 35 as clearly shown in FIG. 3 of the drawings biases the indicating means 32 in a clockwise direction as viewed in FIG. 3 of the drawings. The indicator 32 is provided with an end 32b adapted to engage the container 11. As the container 11 expands under the pressure of liquid supplied thereto from an ordinary water supply source, the indicating lever 32 is pivoted in a counterclockwise direction from the position shown in FIG. 3 of the drawings to the position shown in FIG. 1. Preferably the lever 32 is provided with suitable indicia generally indicated at 38 in the drawings which indicate the extent of filling of the container 11 and a suitable index member 39 associated with the closure means 20 then will indicate the amount of liquid contained within the container 11. As illustrated, the indicia indicates conditions of "empty," "half full" and "full" but it might equally well be calibrated in gallons, quarts, pounds or some other suitable measure as will readily be understood by those skilled in the art.

As far as the apparatus for dispensing the spray mixture within the container 11 is concerned, any suitable well known mechanism may be provided. As illustrated in FIGS. 2 and 3 of the drawings, a suitable tubular extension 40 threadedly secured to the inside of the closure means 20 depends into the container 11 whereby the pressure within the container 11 forces the material to be dispensed into the bottom of the tubular member 40. This tubular member is connected with a suitable passageway 41 defined within the closure means 20 preferably controlled by any suitable valve mechanism indicated in FIG. 3 of the drawings by the reference numeral 42. This valve mechanism 42 is illustrated as being sort of a push type valve in which the valve stem 43 extends above the closure means 20 and is engageable by a suitable trigger 44 pivotally mounted as indicated at 45 to the closure means 20. The trigger is located so that it may readily be manipulated by one finger of the hand carrying the spray device by the handle 25. The passageway 41 is preferably connected by suitable adapter 48 and a flexible hose member 49 to a rigid conduit 50 at the end of which a suitable spray nozzle 51 of any suitable type may be employed.

With the arrangement disclosed in the drawings, it is intended for the operator to watch the indicator 32 which acts merely as a gauge, whereby he will shut off the source of supply when the desired filling is obtained. If the operator does not watch the indicator 32, it is possible that he might overfill the container with the possibility of rupturing the container 11. To this end, the indicator 32 may control a suitable shut off valve which, upon a predetermined filling, will close the passageway 26 and prevent overfilling. Additionally, if it is desired to provide a device which cannot be overfilled, a suitable enclosure of fixed size surrounding the container 11 could be provided which will, of course, limit the maximum filling of expansible chamber 11. This container might be a plastic container of fixed volume which cannot expand and which when the space contained therein is all taken up by the expansion of container 11 will then limit the amount of liquid which can be supplied to the container 11.

In FIG. 4 of the drawings there is disclosed an arrangement wherein an outer fixed volume container is provided to limit the maximum filling of the expansible container 11. The corresponding parts of FIG. 4 are designated by the same reference numerals as in the preceding embodiments. In FIG. 4 there is illustrated an outer rigid essentially spherical container 55 which may be formed of any suitable material such as metal, plastic or the like. For example, the container 55 may be made of two hemispherical shells comprising an upper unit 55a and a lower unit 55b which are joined as indicated at 56 by any suitable means. For the purpose of securing the fixed volume container 55 to the spray device, numerous arrangements may be employed. For example, the fixed volume container 55 might comprise an integral part of adapter 17. As illustrated, however, fixed volume container 55 is provided with a U-shaped peripheral flange 57 surrounding the upper open end which is receivable with the recess 15 defined in flange 11a and which encloses the flange 17c of adapter 17 as clearly shown in FIG. 4 of the drawings. Preferably, the fixed volume container 55 is provided with a somewhat flat or even concave bottom indicated at 58 so to permit the spray device to be supported from any surface.

To permit free ingress and egress of air with respect to the fixed volume container 55, a plurality of small openings 59, 60 and 61 are provided. The opening 59 is indicated as being adjacent the bottom of the container, the opening 60 is indicated as being located near the center of the container, and the opening 61 is indicated as being located near the top of the container 55. It will be apparent that as the expansible container 11 expands during a filling operation the air within container 55 escapes through the various openings. Similarly, as liquid is dispensed from the flexible container 11 the space within fixed volume container 55 is permitted to be filled with air through these openings 59, 60 and 61.

In view of the detailed description included above, the operation of the present invention will readily be understood by those skilled in the art. It will be appreciated that there has been disclosed a spray device which may weigh only a few pounds and which may be stored in a very small space. Furthermore, it completely eliminates the requirement of complicated pumping mechanisms and involves a container of resilient material within which the energy for spraying the liquid is stored. Moreover, this energy is initially stored in these resilient walls. Simultaneously with the supply thereto of the water, it forms a part of the material to be sprayed. Furthermore, the interior of the container which is merely a very small bag of rubberlike material can readily be cleaned between the spraying of widely different materials.

It will be apparent to those skilled in the art that the present invention is not limited to the particular construction illustrated and described but that various changes and modifications may be made without departing from the spirit and scope of the invention. It is intended in the appended claims to cover all those changes and modifications which fall within the true spirit and scope of the present invention.

What is claimed as new and desired to be secured by Letters Patent of the United States is:

1. In a spray device, the combination of a resilient container of rubberlike material capable of expanding many times is normal size, said container being open at one end only, removable closure means for the open end of said container, means for attaching said closure means to the open end of said container in a pressuretight manner, means defining a first passageway in said closure means for connecting said device to a source of liquid under pressure whereby selected quantities of liquid under pressure may be placed in said container to cause expansion thereof and to store energy in the resilient walls of said container, valve means for preventing the escape of fluid through said first passageway upon disconnecting the same from said source of liquid under pressure, and valve controlled spray means including a second passageway in said closure means for dispensing the liquid under pressure stored in said container.

2. A spray device comprising a resilient container of rubberlike material capable of expanding many times its normal size, said container being open at one end only, a subassembly including a cover for the open end of said container and a handle for said device, means for relating said cover to the open end of said container in a pressure-tight manner, means defining a passageway in said subassembly for connecting said container to a source of liquid under pressure whereby selected quantities of liquid under pressure may be placed in said container to cause expansion thereof and to store energy in the resilient walls of said container, valve means for preventing the escape of fluid through said passageway upon disconnecting the same from said source of liquid under pressure, means defining a discharge passageway in said cover for dispensing liquid under pressure stored in said container, a release valve disposed in said discharge passageway, and finger actuated trigger means adjacent said handle for actuating said release valve.

3. The spray device of claim 1 wherein means are provided responsive to the expansion of said walls to indicate the quantity of liquid in said container.

4. The spray device of claim 1 wherein said container comprises an annular flange, and adapter means are provided to clamp said flange in sealed relationship with said closure means.

5. In a spray device, the combination of a resilient cylindrical container of rubberlike material capable of expanding many times its normal size, said container having one open end and one closed end, a flange on the exterior of said container disposed a predetermined distance below said open end, removable closure means for the open end of said container including a depending cylindrical portion telescopically receiving the portion of said container above said flange, means defining a recess in the upper surface of said flange for receiving the end of said cylindrical portion, adapter means for releasably relating said closure means to the open end of said container in a pressuretight manner, means defining a first passageway in said closure means for connecting said device to a source of liquid under pressure whereby selected quantities of liquid under pressure may be placed in said container to cause expansion thereof and to store energy in the resilient walls of said container, valve means for preventing the escape of fluid through said first passageway upon disconnecting the same from said source of liquid under pressure, means defining a second passageway in said closure means, and valve controlled spray means connected to said second passageway for dispensing the liquid under pressure stored in said container.

6. A spray device comprising a resilient cylindrical container of rubberlike material capable of expanding many times its normal size, said container having one open end and one closed end, an integral flange on the exterior of said container disposed a predetermined distance below said open end, removable closure means for the open end of said container including a depending cylindrical portion telescopically receiving the portion of said container above said flange, means defining a recess in the upper surface of said flange for receiving the end of said cylindrical portion, adapter means for releasably relating said closure means to the open end of said container in a pressuretight manner, means defining a first passageway in said closure means for connecting said device to a source of liquid under pressure whereby selected quantities of liquid under pressure may be placed in said container to cause expansion thereof and to store energy in the resilient walls of said container, valve means for preventing the escape of fluid through said first passageway upon disconnecting the same from said source of liquid under pressure, means defining a second passageway in said closure means, valve controlled means connected to said second passageway for dispensing the liquid under pressure stored in said container, and handle means integral with said closure means for carrying said spray device.

7. The spray device of claim 1 wherein means are provided to prevent overfilling of said container.

8. The spray device of claim 3 wherein said last mentioned means comprises a lever pivoted to said closure means with one end of said lever engageable with the outside of said container.

9. The spray device of claim 1 wherein means are provided for limiting the maximum quantity of liquid stored in said container.

10. An expansible container for a spray device of the type in which potential energy is stored in the walls defining the container when the container is expanded by internal pressure stretching said walls in tension comprising, an elongated cylindrical member closed at one end and open at the other end, an external annular flange of rectangular cross section integrally formed with said member and surrounding the same for removably securing said container to the spray portion of a spray device, said flange being adjacent the open end of said member, the walls between said flange and said closed end including said closed end comprising said walls in which potential energy is stored, said container including an integral cylindrical sealing extension projecting beyond said flange in the opposite direction from said closed end, said sealing extension having a thinner wall than the unexpanded expansible walls of said container.

11. The expansible container of claim 10 wherein the cylindrical member has a length of the order of eight inches, a diameter of the order of three inches, and a thickness of between one-eighth and one-fourth inch, thereby to insure a substantially uniform pressure for different volumetric expansions of said container.

12. The expansible container of claim 10 wherein there are provided means defining a first annular recess in said flange on one side thereof, and means defining a second annular recess in said flange on the opposite side thereof, the volume of said flange of rectangular cross section being large so as to prevent said flange from being forced through an opening of a width equal to the distance between the bottoms of said recesses upon expansion of the walls of said container.

References Cited in the file of this patent

UNITED STATES PATENTS

| | | |
|---|---|---|
| 2,352,680 | Armitage | July 4, 1944 |
| 2,371,632 | Lippincott | Mar. 20, 1945 |
| 2,816,690 | Lari | Dec. 17, 1957 |
| 2,864,536 | Bauerlein et al. | Dec. 16, 1958 |
| 2,918,936 | Dawson | Dec. 29, 1959 |

FOREIGN PATENTS

| | | |
|---|---|---|
| 138,567 | Australia | Sept. 5, 1950 |